United States Patent [19]
Lewis

[11] Patent Number: 5,850,637
[45] Date of Patent: Dec. 22, 1998

[54] PLIABLE EYEGLASS ATTACHMENT FOR DEFLECTING WIND AROUND THE EAR

[76] Inventor: John M. Lewis, 820 Mercer St., Fredericksburg, Va. 22401

[21] Appl. No.: 759,310

[22] Filed: Dec. 2, 1996

[51] Int. Cl.[6] ............................. A41D 9/02; G02C 5/14
[52] U.S. Cl. .............................................. 2/455; 351/122
[58] Field of Search ........................ 2/455, 449, 209, 2/10, 13, 12, 15, 9, 423; 351/158, 155, 131, 132, 138, 123, 122, 47, 44, 156

[56] References Cited

U.S. PATENT DOCUMENTS

| | | | |
|---|---|---|---|
| 1,853,131 | 4/1992 | Lewis | 2/209 |
| 3,807,526 | 4/1974 | Synator | 351/123 |
| 3,943,925 | 3/1976 | Leight | 128/152 |
| 4,751,746 | 6/1988 | Rustin | 2/13 |
| 4,796,307 | 1/1989 | Vantine | 2/13 |
| 4,856,089 | 8/1989 | Horton | 2/13 |
| 5,086,789 | 2/1992 | Tichy | 2/209 |
| 5,201,856 | 4/1993 | Edwards | 2/209 |
| 5,231,704 | 8/1993 | Hildenbrand | 2/423 |
| 5,323,493 | 6/1994 | Ogiba | 2/10 |
| 5,402,189 | 3/1995 | Gill | 2/449 |
| 5,438,706 | 8/1995 | Lambur | 2/449 |
| 5,477,564 | 12/1995 | Tichy | 2/209 |
| 5,619,750 | 8/1997 | Allewalt | 2/449 |

Primary Examiner—Gloria M. Hale

[57] ABSTRACT

Lightweight wind deflectors having Mounting Sleeves attachable to Eyeglass Temple Stems. The Mounting Sleeves are flexible with rectangular cutouts running their lengths giving them the ability to attach or slide onto the Eyeglass Temple Stems. The Ear Flaps which deflect wind around the ears attach to Pressure Plate Hinge's, which establish and maintain pressure between the Ear Flaps and the wearer's cheekbones, they also allow lateral movement of the Ear Flap's for removal and placement on the head. Sleeve Shims can be installed into the rectangular cutouts of the Mounting Sleeves to compensate for different size eyeglass frames.

12 Claims, 2 Drawing Sheets

PLIABLE EYEGLASS ATTACHMENT FOR DEFLECTING WIND AROUND THE EAR

BACKGROUND

1. Field of Invention

This is an invention which relates to eyeglass attachments, when worn it will deflect wind around a person's ear canal to minimize wind noise.

2. Discussion of Prior Art

Endurance bicycle riding or prolonged exposure of the ear without protection from the wind can result in fatigue or, mild pain.

Although I did not find any inventions that attach to eyeglasses and look like this invention, I did come across several inventions related to the subject of protecting the ear from wind damage, noise, and sunlight as follows:

U.S. Pat. No. 5,477,564 to J. B. Tiche (1995) discloses a triangle flap designed to be used specifically with bicycle helmets. It attaches to the straps which keep the helmet in place on a persons head and was invented to protect the ear from wind noise. This invention is different in the fact that it can only be used with a bicycle helmet and although it claims to protect the ear from wind noise it does so in a different fashion. This invention differs chiefly in it's method of attachment to the head, with the use of a helmet. This invention also lacks the "sleek look" of my invention.

U.S. Pat. No. 4,751,746 to Bobby J. Rustin (1992) discloses a pair of eyeglass attachments designed to shield the ear from sun and wind noise. There are significant differences between my invention and U.S. Pat. No. 4,751746 in the method of attachment and overall purpose and design. U.S. Pat. No. 4,751,746 is designed to stretch all the way from the lens of the glasses they are attached to, the length of the glass temple stem, and completely cover the ear. This offers significant differences in look and function. For instance, this attachment is not designed to come into contact with the wearers head. Also, this invention is not easy to attach and relies on specific type eyeglass frames in order to connect properly. For instance, if the pair of eyeglasses doesn't have a substantial ear hook the ear covering portion of the invention will not be supported properly.

U.S. Pat. No. 5,231,704 to Francis J. Hildenbrand (1992) discloses an attachable ear protection device. The significant differences of this invention are the method of attachment and design of the ear piece. This device is a soft material attached to a helmet, again using the chin straps for support.

U.S. Pat. No. 5,323.493 to Frank M. Ogliba (1994) discloses a protective device meant mainly to keep the ear warm while skiing. It is an ear covering which folds on the strap of a pair of goggles and then covers the ears when the goggles are placed onto the wearer's head. Although described as sound permeable, this invention is constructed of rather solid insulating material. These two characteristics identify the main differences between this invention and mine.

U.S. Pat. No. 5,086,789 to J. B. Tichy (1992) discloses a wind deflector which attaches to a pair of goggles. It is a C-shaped device which surrounds the ear and then a "sound permeable" cover is placed over the ear and around the C-shaped support. Again the main difference of this invention is it's method of attachment and design. The ear piece of this invention is attached to an arm which goes under the strap of the goggles. Another significant difference is that this invention completely covers the ear and more or less "blocks" the wind as opposed to deflecting it which is the function of my invention.

OBJECTS AND ADVANTAGES

Accordingly, several objects and advantages of my invention are:

(a) To provide bicyclists or any person exposed to wind noise for prolonged periods of time lightweight, comfortable, stylish and easy to use protection from fatigue and possible hearing damage due to direct exposure of the ear to wind.

(b) To provide, mainly for high speed or long distance cyclists, greater comfort and a "quieter" more enjoyable ride from noise generated by wind hitting the ear canal directly.

(c) To provide ear protection from the wind in a safe manner insuring through design that the wearer still have the ability to hear well when the invention is applied and enable the wearer to enjoy and hear sounds better with the reduced wind noise.

(d) To provide a device that will be easy and inexpensive to manufacture which will work in conjunction with a pair of glasses. The glasses although not physically part of the invention herein will be the chief mechanism of support for the invention.

Further objects and advantages of my invention will become apparent from consideration of the drawings and ensuing description.

REFERENCE NUMERALS FOR DRAWINGS

| Mounting Sleeve | 2 | Contour Edge | 8 |
| Pressure Plate Hinge | 4 | Sleeve Shim | 10 |
| Far Flap | 6 | Eyeglass Temple Stem | 12 |
| | | Ear Hook | 14 |

SUMMARY OF THE INVENTION

In view of the forgoing features inherent in the known-types of wind deflectors of the prior art, the present invention is unique in one substantial way. It's principal means of support is a pair of eyeglasses or sunglasses. This offers unique advantages in that bulky helmets or more complicated attachment methods mentioned in some of the prior art references are not necessary. In other words, this invention used in conjunction with a pair of eyeglasses would be very practical considering other apparatus already excepted by today's cyclists.

Furthermore, it is another object of the present invention to provide a new and improved air deflector for bicyclists, one in which may be easily and efficiently manufactured and marketed.

This together with other objects of the invention, along with various features of novelty which characterize the invention are pointed out with particularity in the following claims forming a part of this disclosure.

DESCRIPTION OF INVENTION

Figure 1:
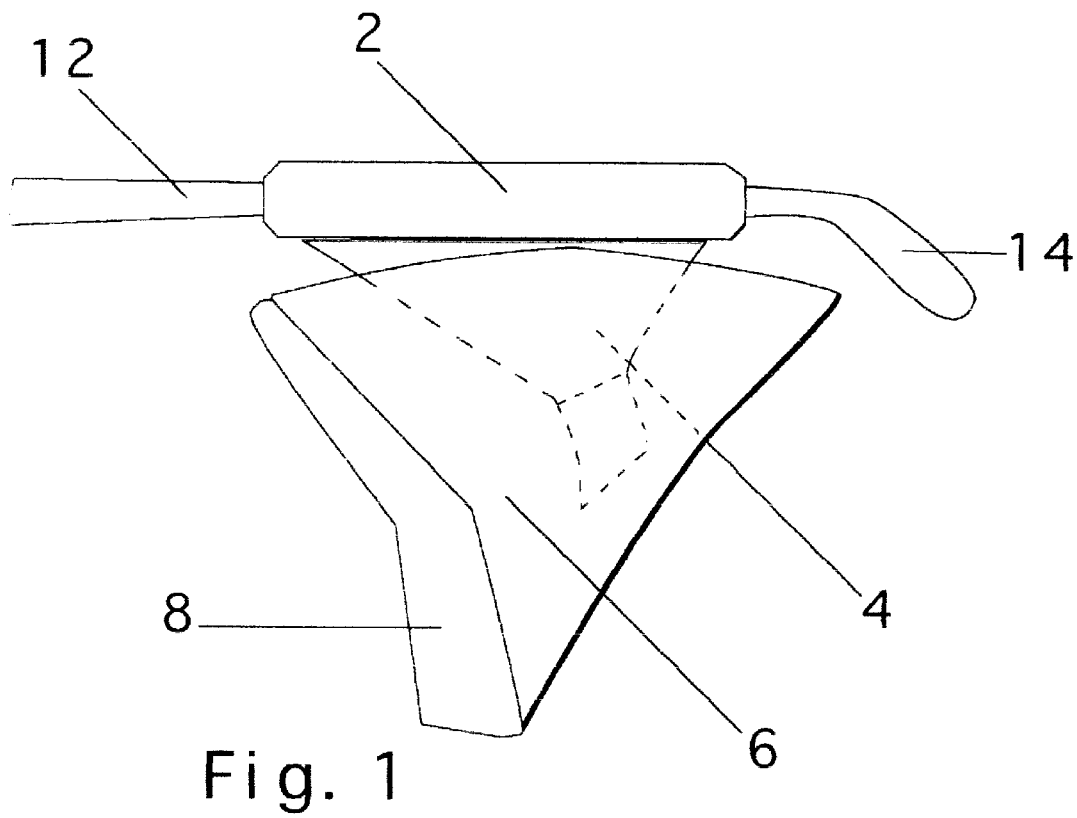
FIG. 1 is a side view angle of the left Ear Flap (6) as it may look when applied to the glasses and then placed on the head. From this angle the Ear Flap (6) would be generally triangular in shape, although other shapes could also be incorporated. The dotted line mechanism behind the Ear Flap (6) is the Pressure Plate Hinge (4) which would keep the Ear Flap (6) stable and push the back of the flap away from the wearer's ear.
Figure 2:
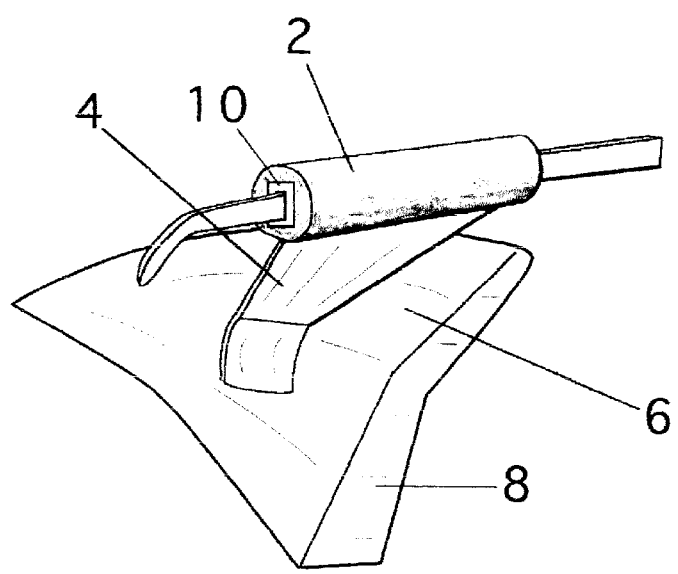
FIG. 2 is a perspective view of the invention from the backside.
Figure 3:
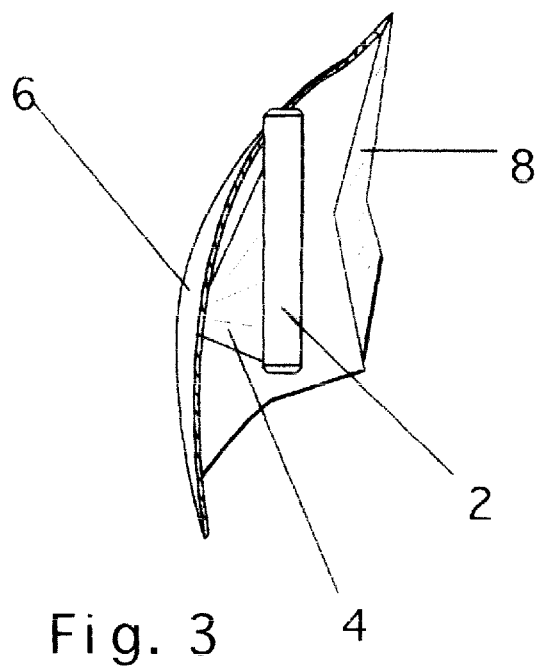
FIG. 3 is a view of the invention from the top.
Figure 5:
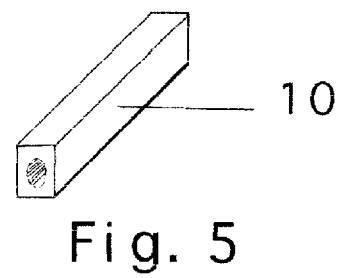
FIG. 5 is a perspective view of a sleeve shim (10). The sleeve shim would be used to compensate for the different size temple stem sizes of glasses.
Figure 4:
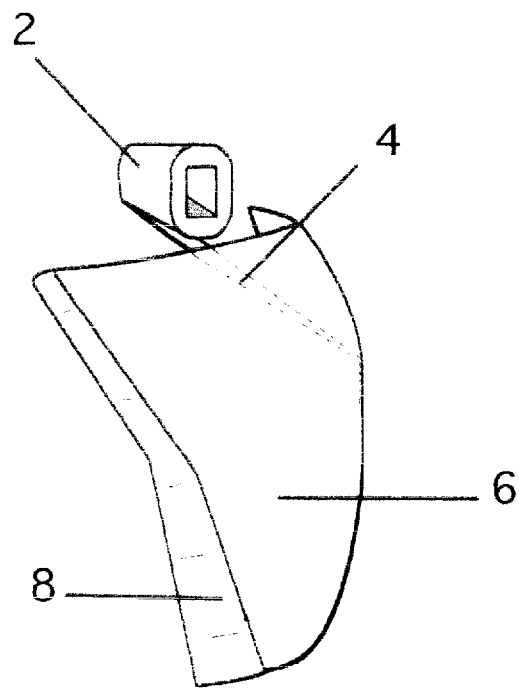
FIG. 4 is a front view angle.

The embodiment of the invention is illustrated in FIG. 1. It consists of a sturdy foam like Mounting Sleeve (2) with a capacity to stretch. The Mounting Sleeve (2) would have a rectangular cut-out running the length of the sleeve so that the invention could be placed on the end of a pair of glasses. To accommodate different size glass stems, Sleeve Shims (10) would be added to the product and could be placed or removed from the rectangular cut-out in the sleeve to compensate for the different size stems.

Attached to the sleeve would be the Pressure Plate Hinge (4) which would connect the Ear Flap (6) to the Mounting Sleeve (2). The pressure plate's main function would be to support the Ear Flap (6) and could be made of a thin plate of stainless steel covered with cloth or rubber. The Pressure Plate Hinge (4) would be shaped and bent so that when the Ear Flap (6) is placed on a person's head, pressure will be transferred from the Eyeglass Temple Stem (12) to the Ear Flap (6) and will allow the Ear Flap (6) to remain snug against the wearer's cheekbone. The Pressure Plate Hinge (4) would also keep the Ear Flap (6) from rotating away from the face of the wearer.

The Pressure Plate Hinge (4) is the only moving part of the invention. It incorporates two positions. One position is as it would appear in the "off head" position. The other is as it would appear in the "on head" position.

The Pressure Plate Hinge (4) would need to have the ability to twist laterally in order for the Ear Flap (6) to be placed on the wearer's head. This lateral action would: one, allow the Ear Flap (6) to be placed on the wearer's head when the glasses were applied: two, create pressure for the Contour Edge (8) to mold to the cheekbone of the wearer and three, push the rear of the Ear Flap (6) away from the wearer's ear. The cut and thickness of the Pressure Plate Hinge (4) together with the rectangular cut of the Mounting Sleeve (10) would keep the Ear Flap (6) from rotating up and away from the wearer's face.

Attached to the Pressure Plate Hinge (4) would be the Ear Flap (6). The Ear Flap (6) is the part of the invention which deflects the wind from the ear. It could be made of a plastic type material and decorated with artwork to enhance the appearance. The Ear Flap (6) would be designed to optimize deflection of wind away from the ear and would be firm enough to withstand wind from directions other than head on, such as from the side. The drawings are based on theoretical ideas, therefore research for production of the working invention may render slightly different drawings.

The Contour Edge (8) would attach to the front of the Ear Flap (6) and would be made of a very flexible material, perhaps a rubber or foam rubber material and would serve to ensure a snug fit of the Ear Flap (6) against the wearer's head. The Contour Edge (8) would also serve to keep the Ear Flap (6) from rotating up and away as it rests against the cheekbone. The Contour Edge (8) would serve, as well, to ensure that no sharp or hard objects approached the eyes of the wearer. The Contour Edge (8) would be soft enough that no injury could result if the invention was worn improperly or too far forward on the face.

OPERATION OF INVENTION

The manner for using the wind deflector is quite simple. The Mounting Sleeves (2) of the left and right Ear Flaps (6) are slid onto the end of the Eyeglass Temple Stems (12). If the Mounting Sleeves (2) do not fit the Temple Stems (12) well, Sleeve Shims (10) can be placed in the Mounting Sleeves (2) to compensate for size differences. This is done by first choosing the correct size Sleeve Shims (10) out of any number of given sizes included in the product's packaging. Once the proper sizes have been selected, the Sleeve Shims can be (10) inserted into the rectangular cutout of the Mounting Sleeves (2). The Mounting Sleeves (2) and the Sleeve Shims (10) are then slid together onto the Eyeglass Temple Stems (12) of the pair of glasses. When both the left and right Mounting Sleeves (2) are in place just forward of the Ear Hooks (14) on the Temple Stems (12) the glasses are ready to be put onto the head of the wearer.

To put the glasses on the wearer's head the front of the Ear Flaps (6) must be twisted away from the cheekbone. While holding the Ear Flaps (6) out, the glasses are then placed on the face. When the glasses are in place the Ear Flaps (6) can be released. The Pressure Plate Hinges (4) will want to return to their natural molded position's and hence this pressure will keep the Ear Flaps (6) against the cheek. The Contour Edges (8) will mold the Ear Flaps (6) to the particular characteristics of the wearer's cheekbone to form an aerodynamic edge that the wind can hit.

Once on the head the Ear Flaps (6) can be adjusted for optimum wind deflection by sliding the Mounting Sleeves (2) either forward or back on the Temple Stems (12).

CONCLUSION, RAMIFICATIONS, AND SCOPE OF INVENTION

Accordingly the reader will see that this invention can be used to deflect wind away from the ear canal of a cyclist. Furthermore the wind deflector has additional advantages in that:

It is easy to use and can be removed or installed without great effort.

It can adapt to many size eyeglass frames with the use of the Sleeve Shims (10).

It can protect the wearer's ear from wind and, at moderate speeds, allow the wearer to hear more than simply wind noise.

It can enhance the "sleek look" of today's bicycle riders.

While the above description contains many specifications, these should not be construed as limitations on the scope of the invention, but rather as an exemplification of one preferred embodiment thereof. Many other variations are possible. For example, the Ear Flap (6) while V-shaped in the FIG. 1 drawing could theoretically be shaped differently. Other examples could include Pressure Plate Hinges (4) of different shapes and strengths. The Mounting Sleeves (2) could as well incorporate many colors, designs and strengths of foam or other related materials.

Accordingly, the scope of the invention should be determined not by the embodiments illustrated but rather by the appended claims and their legal equivalents.

I claim:

1. A wind deflector of the type attachable to eyeglass temple stems comprising a mounting means, a pressure plate hinge adjacent to and communicating with said mounting means, and an ear flap communicating with said pressure plate hinge.

2. The wind deflector of claim 1 wherein said mounting means is a flexible sleeve.

3. The wind deflector of claim 1 wherein said pressure plate hinge is a flexible means for transference of vertical and lateral support from said eyeglass temple stems to said ear flap.

4. The wind deflector of claim 1 wherein said ear flap communicates with the human cheek and generally covers the ear when the wind deflector thereof is attached to said eyeglass temple stems and placed on a human head.

5. The wind deflector of claim 1 wherein said ear flap extends partially the length of the eyeglass temple stems.

6. The wind deflector of claim 1 wherein said ear flap is generally triangular shaped from a profile view angle.

7. The wind deflector of claim 1 wherein said ear flap is a means for deflecting wind around a human ear when said wind deflector and temple stems are placed on a human head.

8. Dual attachments to eyeglasses for deflecting wind around the ears, one being an attachment to the left temple stem of said eyeglasses and the other being an attachment to the right temple stem of said eyeglasses, each comprising a mounting sleeve, an ear flap, and a pressure plate hinge communicating said mounting sleeve to said ear flap.

9. The attachments of claim 8 wherein said pressure plate hinge is a means of transferring vertical and lateral support from said temple stems to said ear flap wherein said ear flap offers continuous pressure against a point forward of a human ear when said attachments to eyeglasses are placed on a human head.

10. The mounting sleeve of claim 8 wherein said mounting sleeve comprises at least a first opening.

11. The opening of claim 10 wherein said opening is employed for the purpose of receiving a sleeve shim and or said temple stems.

12. The sleeve shim of claim 11 wherein said sleeve shim is a variable size adjustment means of attachment to said temple stems.

\* \* \* \* \*